US009461285B2

(12) United States Patent
Klausmann et al.

(10) Patent No.: US 9,461,285 B2
(45) Date of Patent: Oct. 4, 2016

(54) MOTOR VEHICLE BATTERY COMPRISING DUMMY CELL AND COOLING PLATE

(71) Applicants: Dr. Ing. h.c. F. Porsche Aktiengesellschaft, Stuttgart (DE); Robert Bosch GmbH, Stuttgart (DE)

(72) Inventors: Alexander Klausmann, Schoenaich (DE); Thomas Fritz, Loechgau (DE); Carsten Mueller, Tiefenort (DE)

(73) Assignees: Robert Bosch GmbH, Stuttgart (DE); Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 315 days.

(21) Appl. No.: 14/087,467

(22) Filed: Nov. 22, 2013

(65) Prior Publication Data

US 2014/0162105 A1   Jun. 12, 2014

(30) Foreign Application Priority Data

Nov. 22, 2012  (DE) ........................ 10 2012 022 765

(51) Int. Cl.
| | |
|---|---|
| H01M 2/10 | (2006.01) |
| H01M 2/02 | (2006.01) |
| B60L 11/18 | (2006.01) |
| H01M 10/625 | (2014.01) |
| H01M 10/6555 | (2014.01) |
| H01M 10/613 | (2014.01) |

(52) U.S. Cl.
CPC ........ *H01M 2/1077* (2013.01); *B60L 11/1874* (2013.01); *B60L 11/1879* (2013.01); *H01M 10/613* (2015.04); *H01M 10/625* (2015.04); *H01M 10/6555* (2015.04); *B60L 2240/545* (2013.01); *H01M 2220/20* (2013.01); *Y02T 10/7005* (2013.01); *Y02T 10/705* (2013.01)

(58) Field of Classification Search
CPC . H01M 10/5004; H01M 2/10; H01M 2/1077
See application file for complete search history.

(56) References Cited

U.S. PATENT DOCUMENTS

| | | | | |
|---|---|---|---|---|
| 1,622,767 A | * | 3/1927 | Cole ..................... | H01M 10/18 |
| | | | | 429/159 |
| 2008/0090137 A1 | * | 4/2008 | Buck ................... | H01M 2/1077 |
| | | | | 429/120 |
| 2008/0318119 A1 | * | 12/2008 | Watanabe ........... | B60L 11/1874 |
| | | | | 429/99 |

(Continued)

FOREIGN PATENT DOCUMENTS

| | | |
|---|---|---|
| DE | 10 2010 012 935 | 9/2011 |
| DE | 10 2010 041 701 | 4/2012 |

OTHER PUBLICATIONS

German Search Report of Sep. 3, 2013.

*Primary Examiner* — Kenneth Douyette

(57) ABSTRACT

A motor vehicle battery having at least one battery module (11, 12) with battery cells (13, 14) positioned one behind the other and bounded by first walls (15) at opposite ends of the battery module (11, 12) and by second walls (16) at opposite longitudinal sides of the battery module (11, 12). Bottom ends of the battery cells (13, 14) bearing against a cooling plate (18). The battery cells (13, 14) of the battery module (11, 12) are pressed together between the first walls (15). A dummy cell (22) is positioned between two adjacent battery cells (13, 14) of the battery module (11, 12). A clamping bolt (23) extends through the dummy cell and presses the battery cells (13, 14) of the battery module (11, 12) against the cooling plate (18) in a second direction perpendicular to the first direction.

9 Claims, 4 Drawing Sheets

(56) References Cited

U.S. PATENT DOCUMENTS

| | | | | |
|---|---|---|---|---|
| 2011/0076540 A1* | 3/2011 | Ronning | ........... | H01M 10/5067 429/120 |
| 2011/0183176 A1* | 7/2011 | Schwab | .............. | H01M 2/1077 429/120 |
| 2012/0028099 A1* | 2/2012 | Aoki | ................... | H01M 2/1077 429/120 |
| 2012/0263988 A1* | 10/2012 | Obasih | .............. | H01M 10/5004 429/98 |
| 2012/0286739 A1* | 11/2012 | O'Brien, Jr. | ........ | H01M 2/1077 320/134 |

* cited by examiner

MOTOR VEHICLE BATTERY COMPRISING DUMMY CELL AND COOLING PLATE

CROSS REFERENCE TO RELATED APPLICATION

This application claims priority under 35 USC 119 to German Patent Appl. No. 10 2012 022 765.5 filed on Nov. 22, 2012, the entire disclosure of which is incorporated herein by reference.

BACKGROUND

1. Field of the Invention

The invention relates to a motor vehicle battery.

2. Description of the Related Art

Known motor vehicle batteries are used as energy stores or traction batteries in hybrid vehicles or electric vehicles. These known motor vehicle batteries typically have a plurality of battery modules, with each battery module having a plurality of battery cells. The battery cells of each battery module are bounded by first walls at opposite longitudinal ends of the respective battery module and by second walls at opposite longitudinal sides of the respective battery module. The bottom end of each battery cell of each battery module typically bear against a cooling plate, with electrical connection poles of the battery cells being formed on top ends of the battery cells. A coolant preferably flows through the cooling plate.

The battery modules of motor vehicle batteries of this kind desireably have as many battery cells as possible. However, mechanical robustness and cooling become more problematic when a greater the number of battery cells are combined in a battery module. The prior art has no motor vehicle batteries that can provide a large number of battery cells with both a sufficiently high mechanical robustness for the battery modules and with good cooling for the individual battery cells.

SUMMARY OF THE INVENTION

The invention relates to a motor vehicle battery with the battery cells of each battery module being pressed together between the first walls that are positioned at the opposite ends of the respective battery module in the longitudinal direction thereof. Furthermore, a dummy cell is positioned between two adjacent battery cells of each battery module approximately in the middle of the respective battery module. A clamping bolt extends through the dummy cell of the respective battery module and presses the dummy cell and the battery cells against with the cooling plate in a second direction perpendicular to the longitudinal direction.

The battery cells of the respective battery module are pressed together between the first walls at the longitudinal ends of the respective battery module. Thus, a high degree of mechanical robustness is provided for the respective battery module even when a large number of battery cells are combined to form the battery module. Additionally, the clamping bolt extends through the dummy cell of the respective battery module and presses the battery cells of the respective battery module together in the direction perpendicular to the longitudinal direction. This aspect of the invention further increases the mechanical robustness of the battery module and the entire motor vehicle battery, while also improving cooling of the battery cells of the respective battery module because the battery cells are pressed together with the cooling plate in the second direction. This ensures that all of the battery cells of a battery module bear against the cooling plate by way of the bottom side of the battery cells in a defined manner.

A clamping rail preferably is on a top end of each battery module and extends in the first or longitudinal direction between the first walls at the opposite ends of the respective battery module. The clamping rail preferably is connected permanently to the first walls. The clamping bolt engages the clamping rail and causes the clamping rail to apply pressing forces in the second direction to all of the battery cells of the respective battery module. Thus, the clamping bolt causes the clamping rail to press all of the battery cells of the respective battery module against the cooling plate. The pressing force exerted by the clamping rail is applied to the top ends of all battery cells of the respective battery module in a defined manner to urge the battery cells of the respective battery module in the second direction and perpendicular to the first or longitudinal direction.

Battery modules preferably are positioned on opposite sides of the cooling plate, and the dummy cells of these opposite battery modules preferably are opposite one another on the cooling plate. At least one clamping bolt preferably extends through the dummy cells and through a recess or hole in the cooling plate so that the clamping bolt presses the bottom ends of the battery cells of the opposite battery modules in the second direction and against the cooling plate. As a result, the bottom ends of the battery cells are pressed against the cooling plate in a defined manner.

Bracing elements preferably engage the first walls that bound the battery cells at the opposite longitudinal ends. The bracing elements press the battery module in the first or longitudinal direction and also enable the battery modules on opposite sides of the cooling plate to be pushed together in the second direction and toward the cooling plate due to forces exerted by the clamping rail and the clamping bolt. As a result, the pressing of two battery modules in the second direction is improved further.

Exemplary embodiments of the invention will be explained in greater detail with reference to the drawings, without the invention being restricted to the exemplary embodiments.

DETAILED DESCRIPTION OF THE PREFERRED EMBODIMENTS

The invention relates to a motor vehicle battery that is used as a traction battery or as an electrical energy store in a hybrid vehicle or electric vehicle. The motor vehicle battery can be discharged to a relatively great extent when an electrical machine of the motor vehicle is operated in motor mode, and can be charged to a relatively great extent when the electrical machine is operated in generator mode.

Figure 1:
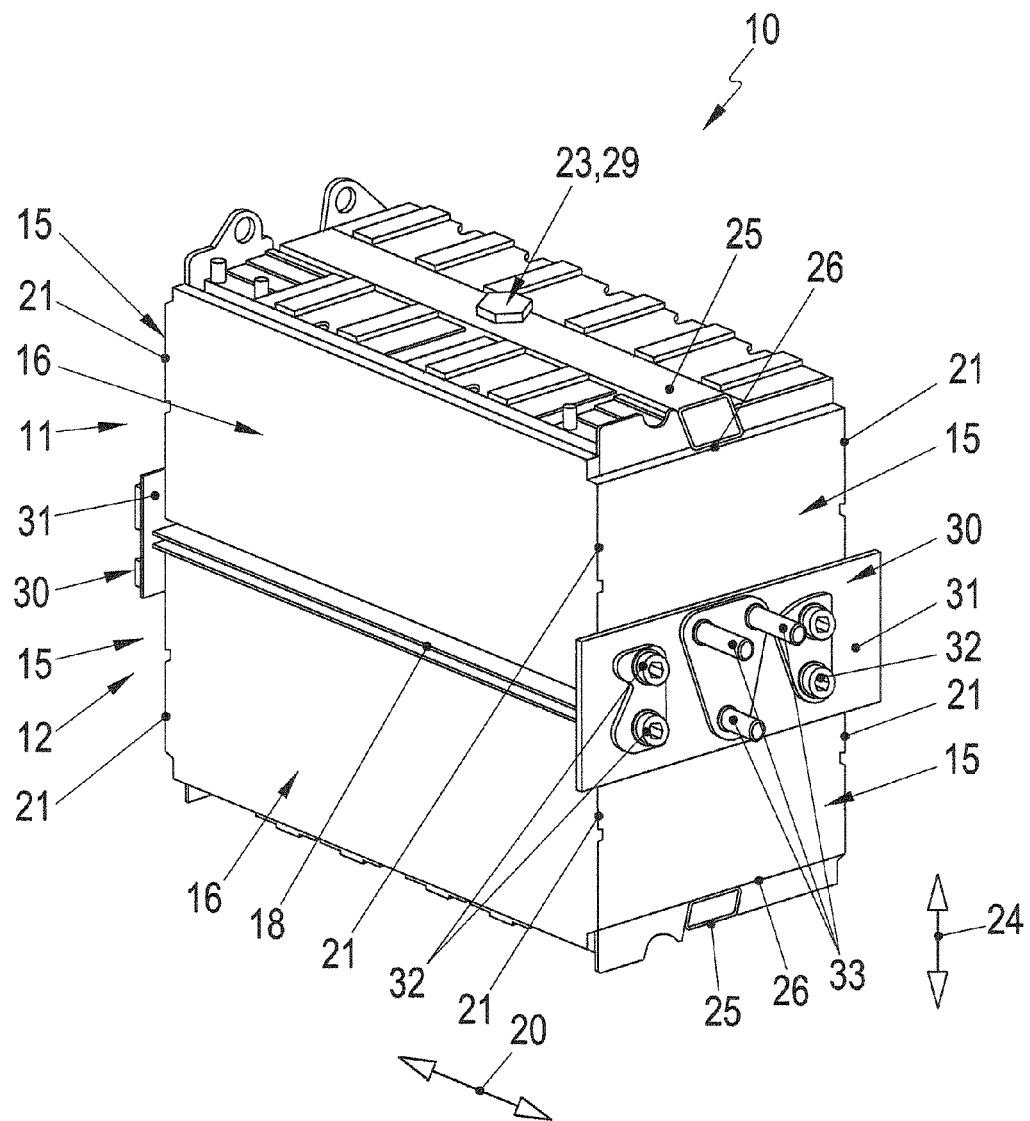
FIG. 1 is a perspective view of a detail from an exemplary embodiment of a motor vehicle battery according to the invention in the region of two battery modules which are situated opposite one another on a cooling plate.

FIG. 1 shows a detail from a motor vehicle battery 10 according to the invention in the region of two battery modules 11, 12. Each of the battery modules 11, 12 has a large number of battery cells 13 and 14 positioned one behind the other.

Figure 2:
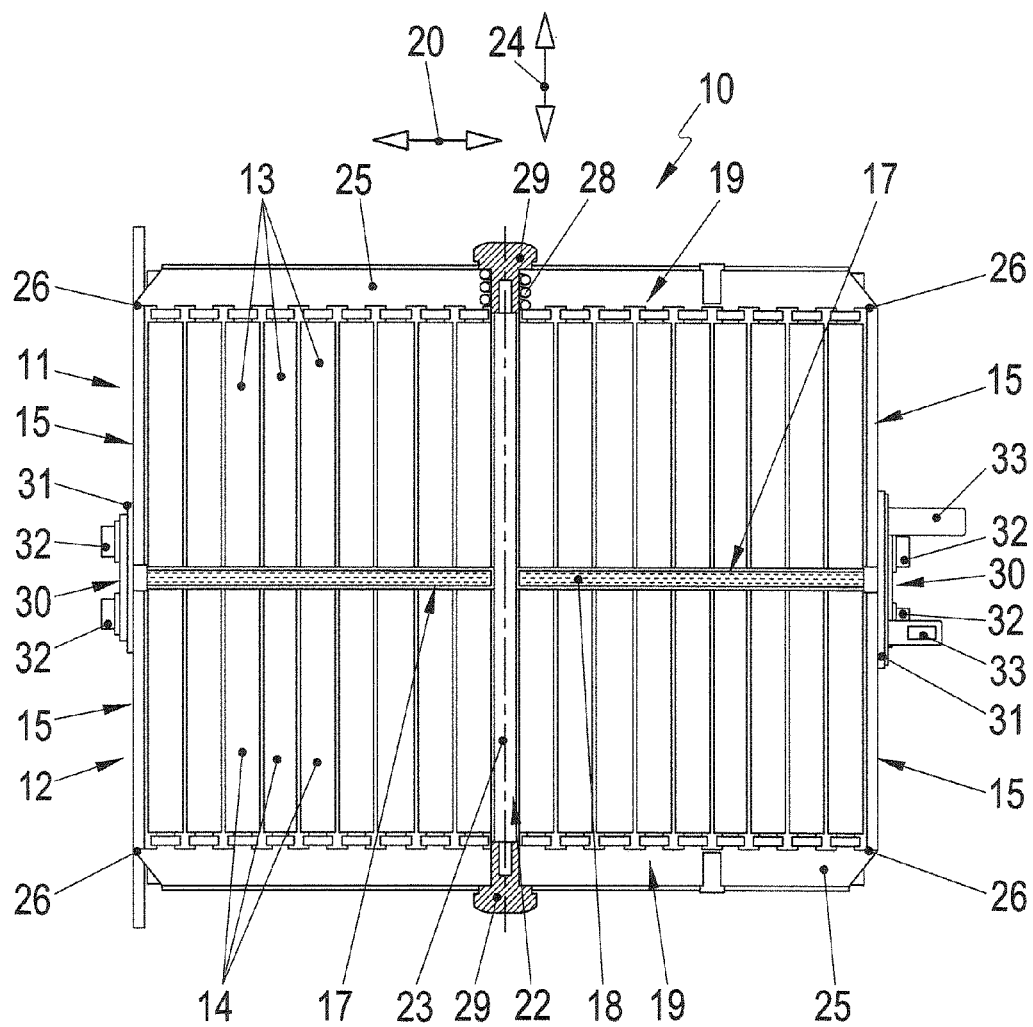
FIG. 2 is a first cross section through the motor vehicle battery of FIG. 1.
Figure 3:
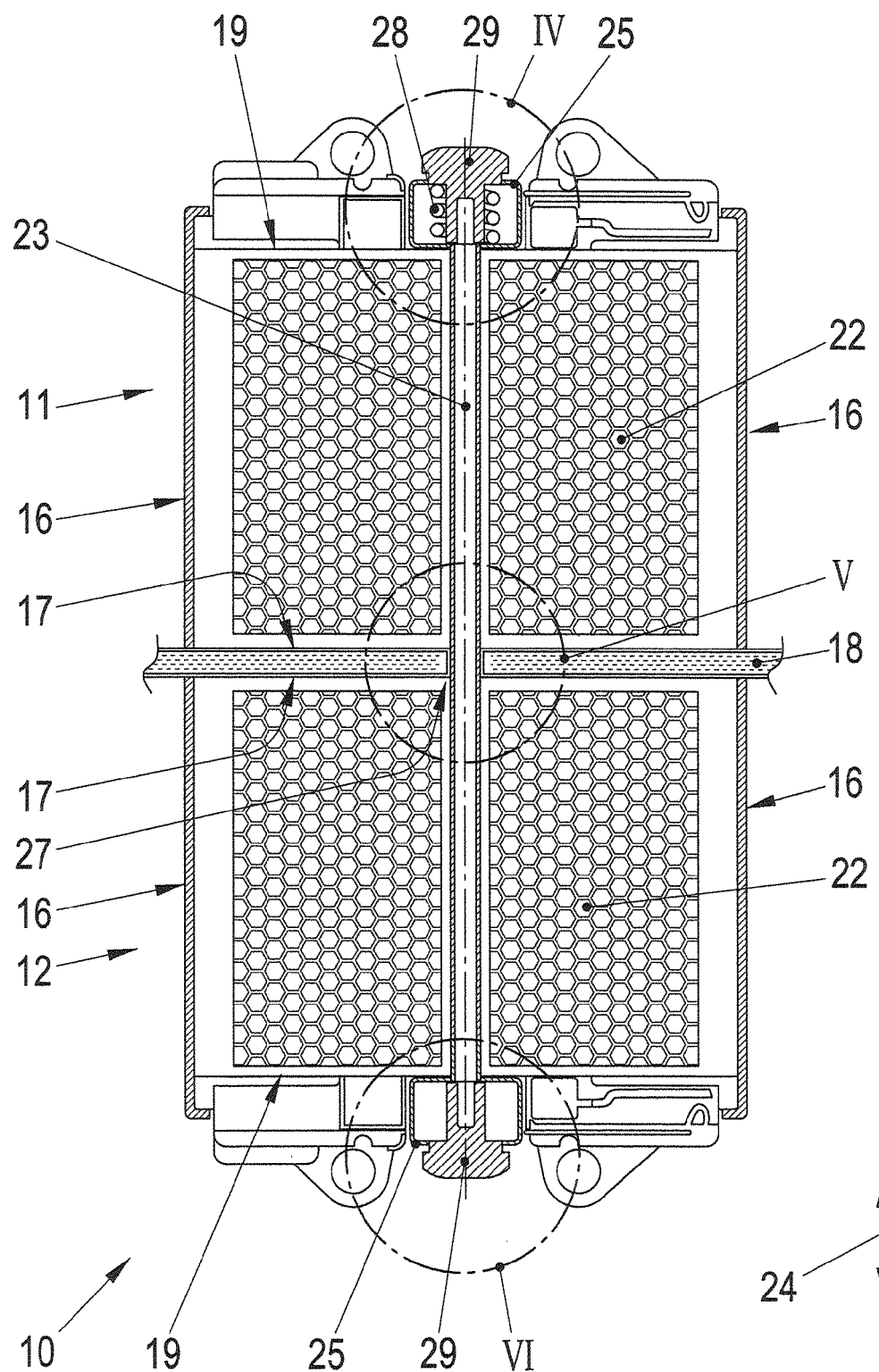
FIG. 3 is a second cross section through the motor vehicle battery of FIG. 1 rotated through 90° in relation to FIG. 2.
Figure 4:
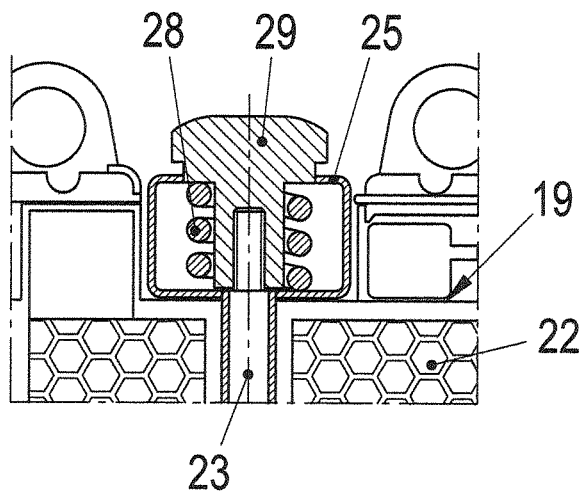
FIG. 4 shows the detail IV of FIG. 3.

The battery cells 13 and 14 of each battery module 11, 12 are bounded by first walls 15 at opposite longitudinal ends and by second walls 16 at opposite lateral sides. FIG. 2 shows a first cross section through the arrangement of FIG. 1 in the longitudinal direction parallel to the second walls 16. FIG. 3 shows a second cross section through the arrangement of FIG. 1 parallel to the first walls 15.

In the illustrated embodiment, a cooling plate 18 is positioned between the two battery modules 11 and 12. Thus, the bottom ends 17 of the battery cells 13 of the first battery module 11 bear against a first side of the cooling plate 18, and the bottom ends 17 of the battery cells 14 of the second battery module 12 bear against a second side of the cooling plate 18. Electrical connection poles of the battery cells 13, 14 are formed on top ends 19 of the battery cells 13, 14 of the battery modules 11, 12.

The battery cells 13 of the battery module 11 and the battery cells 14 of the battery module 12 are pressed together between the first walls 15 at opposite ends of the respective battery modules 11, 12 in a first direction 20, which is the longitudinal direction of the respective battery module 11, 12.

The first walls 15 at the opposite longitudinal ends of the respective battery module 11, 12 are welded to the second walls 16 at the opposite lateral sides of the respective battery module 11, 12 in the region of abutment edges 21 of the walls 15, 16. The geometric dimensions of the walls 15, 16 are matched to the geometric dimensions of the battery cells 13, 14 that are combined to form the battery modules 11, 12 so that the pressing in the longitudinal direction 20 can be adjusted in a defined manner.

Each battery module 11, 12 of the motor vehicle battery 10 has a dummy cell 22 positioned between two adjacent battery cells 13, 14 of the respective battery module 11, 12 approximately in the middle of the respective battery module 11, 12 as seen in the longitudinal direction 20. The dimensions of the dummy cell 22 preferably correspond to the dimensions of a battery cell 13 or 14. A dummy cell 22 also bears against the cooling plate 18 by way of a bottom end 17. A top end 19 of the dummy cell 22 lies in a plane with the top ends 19 of the battery cells 13, 14 of the respective battery module 11, 12. The dummy cell 22 is not used to store electrical energy. A clamping bolt 23 extends through the dummy cells 22 of the battery modules 11 and 12 in a second direction 24 that runs perpendicular to the longitudinal direction 20 and presses the battery cells 13, 14 of the respective battery modules 11 and 12 together with the cooling plate 18. This pressing of the battery cells 13 14 of the battery modules 11, 12 against the cooling plate 18 in the second direction 24 improves the mechanical robustness of the battery modules 11, 12 of the motor vehicle battery 10 and also ensures that the bottom ends 17 of all of the battery cells 13, 14 bear against the cooling plate 18 in a defined manner so that all of the battery cells 13, 14 can be cooled effectively.

Clamping rails 25 extend on the top and bottom ends 19 of the battery cells 13, 14 of the battery modules 11, 12. The clamping rails 25 extend in the longitudinal direction 20 between the first walls 15, which are at the longitudinal ends of the respective battery modules 11, 12. Additionally, the clamping rails 25 are approximately centrally between and parallel to the second walls 16, which are at the lateral sides of the battery module 11, 12. The clamping rails 25 extend in the longitudinal direction 20 and are connected permanently by welding or the like to the first walls 15 at the ends of the battery modules 11, 12 in the region of abutment edges 26.

The clamping bolt 23 that extends through the dummy cells 22 of the battery modules 11 and 12 that are opposite one another in relation to the cooling plate 18. The clamping bolt 23 engages on the clamping rails 25 and applies pressing forces to the battery cells 13, 14 of the battery modules 11, 12 in the second direction 24. As a result, all of the battery cells 13, 14 of the battery modules 11, 12 that are opposite one another on the cooling plate 18 have their bottom ends 17 bear against the cooling plate 18 in a defined manner. Thus, effective cooling is ensured for all of the battery cells 13, 14 of the battery modules 11, 12.

The dummy cells 22 of battery modules 11, 12 that are opposite one another on the cooling plate 18 are at the identical point in the respective battery module 11, 12 as seen in the longitudinal direction 20. As a result, the clamping bolt 23 can extend through the dummy cells 22 of the battery modules 11 and 12 that are situated opposite one another in relation to the cooling plate 18.

Figure 5:
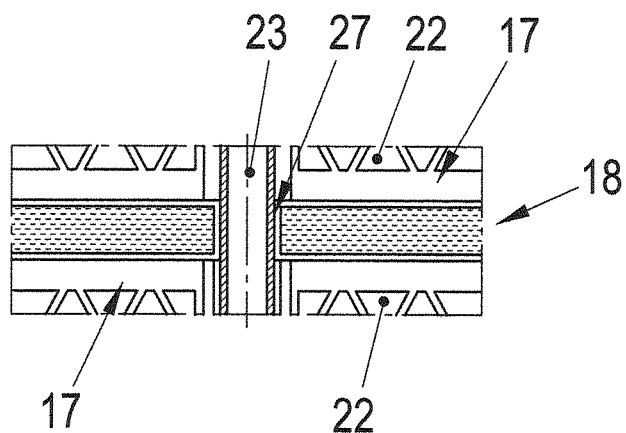
FIG. 5 shows the detail V of FIG. 3.
Figure 6:
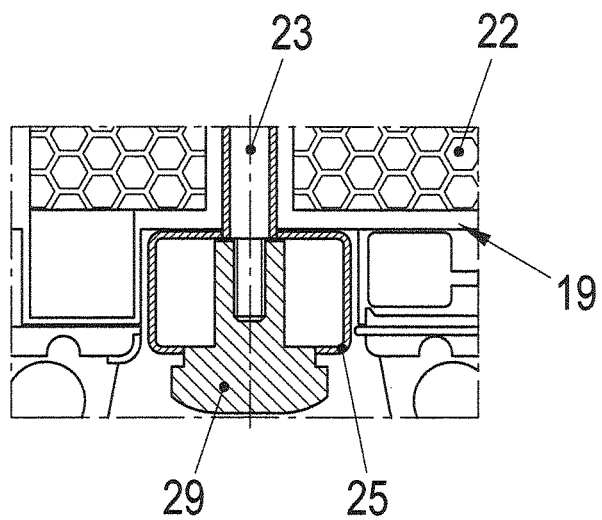
FIG. 6 shows the detail VI of FIG. 3.

The clamping bolt 23 that extends through the dummy cells 22 of the battery modules 11 and 12 also extends through a hole 27 in the cooling plate 18, as shown in FIGS. 3 and 5.

The clamping bolt 23 engages on the clamping rail 25 of the battery module 12, which is at the bottom in FIG. 3, via a first clamping screw 29. The clamping bolt 23 engages on the clamping rail 25 of the battery module 11, which is at the top in FIG. 3, via a second clamping screw 29 and additionally via a spring element 28. The second clamping screw 29 is tightened against the spring force provided by the spring element 28. Thus, the force applied to the clamping rails 25 is adjusted, and the bracing force for the battery cells 13 and 14 of the battery modules 11 and 12 against the cooling plate 18 in the second direction 24 also is adjusted.

FIG. 1 shows only a detail from a motor vehicle battery 10. A respective plurality of battery modules 11, 12 are positioned on the opposite sides of the cooling plate 18, with respectively opposite battery modules 11, 12 being pressed together by clamping bolts 23 in the longitudinal direction 20 and in the second direction 24. However, the invention also can be used when at least one battery module comprising a plurality of battery cells is positioned only on one side of a cooling plate 18.

A respective further bracing element 30 preferably engages on the first walls 15 in the region of the ends of the battery modules 11 and 12 that are opposite one another on the cooling plate 18. The bracing elements 30 press the battery modules 11 together in the second direction 24 and also press the battery modules 12 that are on the opposite side of the cooling plate 18 together in the second direction 24.

Each of bracing element 30 has a plate-like base body 31 with a plurality of holes through which clamping screws 32 extend. Tightening the clamping screws 32 applies an additional pressing force on the battery modules 11 and 12 in the second direction 24 via the first walls 15, which are at the ends of the battery modules 11 and 12. As a result, the pressing of the battery cells 13, 14 of the battery modules 11, 12 against the cooling plate 18 is assisted and further improved.

Supporting bolts 33 project from the plate-like base body 31 of the bracing element 30 and function to secure the motor vehicle battery 10 to a body structure of the motor vehicle.

The preferred exemplary embodiment of the motor vehicle battery 10 according to the invention accordingly has a plurality of battery modules 11, 12, each of which has a plurality of battery cells 13 and 14 positioned one behind the other, with at least one respective battery module 11, 12 being positioned on either side of a cooling plate 18 that functions to cool the battery cells 13, 14 of the battery modules 11, 12. Battery modules 11, 12 situated directly opposite one another in relation to the cooling plate 18 are pressed together with the cooling plate 18 with the aid of a clamping bolt 23 that extends through the dummy cells 22 of the opposite battery modules 11, 12. The dummy cells 22 are positioned between two adjacent battery cells 13, 14 approximately in the middle of the battery modules 11, 12 as seen in the longitudinal direction 20 of the battery modules 11, 12.

The clamping bolt 23 extends through the cooling plate 18 and interacts with clamping rails 25 that extend in the region of the top ends 19 of the battery cells 13, 14 of the respective battery module 11, 12 in the longitudinal direction of said battery module. The bracing force applied by the clamping bolt 23 in the second direction 24 is applied to all of the battery cells 13, 14 of the battery modules 11, 12 via the clamping rails 25. As a result, effective cooling by the cooling plate 18 can be ensured for all battery cells 13, 14.

The bracing of the battery cells 13, 14 of the battery modules 11, 12 with the cooling plate 18, which is already ensured by the clamping bolt 23, can be improved by the bracing elements 30 that engage on the first walls 15 in the region of the ends of the battery modules 11, 12.

A high degree of mechanical robustness and a high degree of cooling for the battery cells 13, 14 of the battery modules 11, 12 can be ensured even when a large number of battery cells 13, 14 are combined one behind the other to form a battery module 11, 12.

What is claimed is:

1. A motor vehicle battery, comprising:
a battery housing having a pair of first side walls spaced apart in a longitudinal direction and a pair of spaced apart second side walls extending in the longitudinal direction between the pair of first side walls;
a cooling plate with opposite first and second surfaces arranged normal to the pair of first side walls and the pair of second side walls;
at least a first battery module having a first plurality of battery cells, each of the battery cells having opposite first and second ends, the first ends of the battery cells being supported on the first surface of the cooling plate, the battery cells being positioned side-by-side and bounded by the pair of first side walls and the pair of second side walls, the battery cells of the first battery module being pressed together in the longitudinal direction between the opposite ends of the first battery module;
a hollow first dummy cell spaced inward from the pair of first side walls and extending in a direction normal to the cooling plate, the hollow first dummy cell being positioned between two adjacent battery cells of the plurality of first battery cells; and
a clamping bolt extending through the first dummy cell and pressing the plurality of first battery cells of the first battery module against the cooling plate in a direction perpendicular to the cooling plate.

2. The motor vehicle battery of claim 1, further comprising a clamping rail disposed along the second ends of the battery cells of the first battery module and extending in the longitudinal direction between the end walls of the first battery module, with the clamping rail being permanently connected to the end walls.

3. The motor vehicle battery of claim 2, wherein the clamping bolt engages on the clamping rail and causes the clamping rail to press the first ends of the battery cells of the first battery module against the first surface of the cooling plate.

4. The motor vehicle battery of claim 2, wherein a pressing direction of the clamping rail runs perpendicular to the longitudinal direction and perpendicular to a transverse direction of the first battery module.

5. The motor vehicle battery of claim 2, further comprising a second battery module, the second battery module having a second plurality of battery cells, each of the battery cells having opposite first and second ends, the second ends of the battery cells being supported on the second surface of the cooling plate, the battery cells being positioned one behind the other and bounded by the first pair of side walls and the second pair of side walls, the battery cells of the second battery module being pressed together in the longitudinal direction between the opposite ends of the second battery module;
a hollow second dummy cell spaced inward from the pair of first side walls and positioned between two adjacent battery cells of the second battery module spaced inward of the opposite ends of the second battery module; and
the clamping bolt extending through the first and second dummy cells and through an opening in the cooling plate so that the clamping bolt presses bottom ends of the battery cells of the first and second battery modules against the cooling plate.

6. The motor vehicle battery of claim 5, wherein the clamping bolt engages the clamping rail of the first battery module by a clamping screw and a spring element.

7. The motor vehicle battery of claim 6, wherein the clamping bolt engages on the clamping rail of the second battery module by a clamping screw.

8. The motor vehicle battery of claim 5, further comprising bracing elements engaging on the pair of first side walls that bound the battery cells at the opposite ends and pressing the battery cells in the longitudinal direction, and the bracing elements facilitate pressing the battery modules toward one another with the clamping bolt.

9. A motor vehicle battery comprising:
a battery housing having a pair of first side walls spaced apart in a longitudinal direction and a pair of spaced apart second side walls extending in the longitudinal direction between the pair of first side walls;
a cooling plate with opposite first and second surfaces arranged normal to and extending between the pair of first side walls and the pair of second side walls;
first and second battery modules mounted respectively on the opposite first and second surfaces of the cooling plate, each of the battery modules having a plurality of battery cells, each of the battery cells having opposite ends, one end of each of the battery cells being supported on one of the surfaces of the cooling plate, the plurality of battery cells of each of the battery modules being positioned side-by-side and bounded by the pair of first side walls and the pair of second side walls, the battery cells of the respective battery modules being pressed together in the longitudinal direction between the opposite ends of the respective battery module, hollow first and second dummy cell aligned with one another and spaced inward from the pair of first side walls, the first and second dummy cells being positioned between two of the adjacent battery cells of the respective first and second battery modules; and a clamping bolt extending through the first and second dummy cells and pressing the battery cells of the respective battery modules against the cooling plate in a direction that runs perpendicular to the cooling plate.

* * * * *